United States Patent
Chen et al.

(10) Patent No.: US 10,650,581 B1
(45) Date of Patent: May 12, 2020

(54) SKETCH-BASED 3D FLUID VOLUME GENERATION USING A MACHINE LEARNING SYSTEM

(71) Applicant: Adobe Inc., San Jose, CA (US)

(72) Inventors: Zhili Chen, San Jose, CA (US); Qingyang Li, Columbus, OH (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/185,587

(22) Filed: Nov. 9, 2018

(51) Int. Cl.
*G06T 17/00* (2006.01)
*G06K 9/62* (2006.01)
*G06T 19/20* (2011.01)
*G06T 13/60* (2011.01)

(52) U.S. Cl.
CPC ............ *G06T 17/00* (2013.01); *G06K 9/6256* (2013.01); *G06T 13/60* (2013.01); *G06T 19/20* (2013.01); *G06T 2219/2021* (2013.01)

(58) Field of Classification Search
None
See application file for complete search history.

(56) References Cited

U.S. PATENT DOCUMENTS

2007/0038421 A1\* 2/2007 Hu ...................... G06F 17/5009 703/6
2014/0005994 A1\* 1/2014 O'Brien ................... G06G 7/57 703/9

OTHER PUBLICATIONS

Staff, C. B. (Aug. 11, 2014). The 7 best 3D tools for simulating fluids. Retrieved from https://www.creativebloq.com/audiovisual/simulating-fluids-81412590. (Year: 2014).\*

\* cited by examiner

*Primary Examiner* — Vu Nguyen
(74) *Attorney, Agent, or Firm* — SBMC (57) ABSTRACT

A 3D fluid volume generation system obtains a 2D sketch of an outline of a fluid for which the 3D fluid volume is to be generated, and generates a 3D fluid volume that matches the user's sketch. The 3D fluid volume generation system implements a coarse volume generation stage followed by a refinement stage. In the coarse volume generation stage, the 3D fluid volume generation system generates a coarse 3D fluid volume based on the 2D sketch. The coarse 3D fluid volume is referred to as "coarse" because the contour of the coarse 3D fluid volume roughly matches the 2D sketch. In the refinement stage, the coarse 3D fluid volume is refined to better match the 2D sketch, and the 3D fluid volume for the 2D sketch is output.

20 Claims, 8 Drawing Sheets

Fig. 8

SKETCH-BASED 3D FLUID VOLUME GENERATION USING A MACHINE LEARNING SYSTEM

BACKGROUND

As computer technology has advanced and computers have become increasingly commonplace in our lives, the creation and sharing of digital content has increased. Situations can arise when creating digital content in which a 3-dimensional (3D) fluid volume is desired, such as to include water, smoke, or other fluids in the digital content. The digital content can include only the 3D fluid, or alternatively other 3D models or 2-dimensional (2D) images or content.

While including a 3D fluid in digital content is desirable in some situations, it is not without its problem. One such problem is that creating a 3D fluid volume typically involves setting up a physically based simulation for fluid. Such simulations can take a long time to run (e.g., on the order of hours to days). Furthermore, such simulations often involve a trial-and-error approach requiring changes to the initial state of the fluid and/or the simulation parameters each time the simulation is run. Additionally, such simulations often require some 3D modeling program experience on the part of the user to set up the simulation system. These problems make it difficult for users to add a 3D fluid volume to their digital content, leading to user frustration with their computers.

SUMMARY

A 3D fluid volume generation system employing a machine learning system as implemented by a computing device is described to generate a 3D fluid volume for a fluid based on a 2D sketch of the outline of the fluid. The 3D fluid volume generation system obtains the 2D sketch of the outline of the fluid and a binary mask of the 2D sketch. Using a machine learning system, the 3D fluid volume generation system generates a coarse 3D fluid volume from the 2D sketch and the binary mask. The 3D fluid volume generation system refines the coarse 3D fluid volume by performing one or more iterations of physically based fluid simulation based on the coarse 3D fluid volume to generate a new 3D fluid volume, and maintains the new 3D fluid volume as the 3D fluid volume for the fluid.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Sketch-based 3D fluid volume generation using a machine learning system is discussed herein. A 3D fluid volume generation system obtains a 2D sketch of an outline of a fluid for which the 3D fluid volume is to be generated. The 2D sketch can be obtained in various different manners, such as receiving a user input 2D sketch (e.g., a user drawing the shape or contour of the fluid on a touchscreen device). The 3D fluid volume generation system generates a 3D fluid volume that matches the user's 2D sketch. The 3D fluid volume matching the user's 2D sketch refers to the contour of the 3D fluid volume (e.g., obtained by applying an edge detector to the 3D fluid volume) being approximately the same as the contour of the 2D sketch. The 3D fluid volume generation system does not need to run a physically based fluid simulation from a first frame, but can directly generate the single static 3D fluid volume that matches the user's 2D sketch, and which can then be added to digital content, optionally with additional 3D fluid volumes (generated from additional 2D sketches) and/or with 2D images.

Generally, the 3D fluid volume generation system implements a coarse volume generation stage followed by a refinement stage. In the coarse volume generation stage, the 3D fluid volume generation system generates a coarse 3D fluid volume based on the 2D sketch. The coarse 3D fluid volume is referred to as "coarse" because the contour of the coarse 3D fluid volume roughly matches (is roughly the same as) the 2D sketch. In the refinement stage, the coarse 3D fluid volume is refined to better match the 2D sketch, and the 3D fluid volume for the 2D sketch is output.

More specifically, the coarse volume generation stage is implemented at least in part by a machine learning system trained to generate a coarse 3D fluid volume from a 2D sketch of an outline of the fluid and a binary mask generated from the 2D sketch. The binary mask is a filled-in version of the 2D sketch, with the outline and the area enclosed by the outline having one value (e.g., 1), and other areas not part of the outline or enclosed by the outline having another value (e.g., 0). The binary mask can be generated as part of the coarse volume generation stage, or alternatively obtained from other sources. In one or more implementations, the coarse 3D fluid volume is a density grid, with each cell in the grid having a value ranging from 0 to 1. A value of 1 indicates the entire cell is filled with fluid, a value of 0 indicates there's no fluid in the cell, and a value between 0 and 1 indicates that the cell is partially filled with fluid.

The machine learning system of the coarse volume generation stage is, in one or more implementations, a convolutional neural network. The convolutional neural network receives the 2D sketch of the outline of the fluid and the binary mask generated from the 2D sketch, and outputs the coarse 3D fluid volume for the fluid. The convolutional neural network is trained on a set of 2D sketches of fluid outlines and binary masks generated from the 2D sketches, and associated known 3D fluid volumes. During training, the 2D sketches of fluid outlines and binary masks generated from the 2D sketches are input to the convolutional neural network. The convolutional neural network includes various filters with weights that are tuned (e.g., trained) to minimize the loss between the known (from the training data) 3D fluid volumes and the 3D fluid volumes generated by the convolutional neural network. Any of a variety of loss functions or algorithms can be used to train the convolutional neural network, such as a cross entropy loss function.

The coarse 3D fluid volume describes the 3D volume represented by the 2D sketch coarsely. The coarse 3D volume is a close approximation of the 2D sketch that roughly matches the 2D sketch in each contour and that can be generated quickly, but typically does not exactly match the 2D sketch. Accordingly, in the refinement stage, the coarse 3D fluid volume is refined to better match the 2D sketch, and output the 3D fluid volume for the 2D sketch. The refinement stage is an iterative process, receiving a 3D fluid volume that, on the first iteration, is the coarse 3D fluid volume generated in the coarse volume generation stage. A binary mask is generated from the received 3D fluid volume, such as by using an edge detector to identify a 2D outline of the 3D fluid volume, and generating a binary mask from the 2D outline (e.g., in the same manner as the binary mask is generated from the 2D sketch discussed above). The difference between the edge of the generated binary mask and the binary mask from the original user input 2D sketch is determined, and a 3D velocity field is generated from the difference between the binary masks. The 3D velocity field is input to a physically based fluid simulator, which generates a 3D fluid volume given the input 3D fluid volume. This generated 3D fluid volume is then the input to the next iteration of the refinement stage. This iterative process continues until the average difference between points on the edge of the generated binary mask and matching points on the binary mask from the original user input 2D sketch is less than a threshold amount, at which point the iterative process stops and the most recently generated 3D fluid volume is the output of the refinement stage.

The 3D fluid volume generation system discussed herein leverages the machine learning system of the coarse volume generation stage with the refinement stage to quickly generate a 3D fluid volume that matches (is approximately the same contour as the input 2D sketch). This 3D fluid volume can then be added to, for example, digital content depicting a static scene. Although physically based simulation is used in the refinement stage, there are typically only a few iterations during the refinement stage, which can typically be performed quickly (e.g., on the order of a few seconds per iteration). The long delays of a physically based simulation fully running from an initial state of the fluid, and changes to the parameters of the physically based simulator in order to achieve the user's desired resultant 3D fluid volume, need not be incurred. Thus, a computing device implementing the 3D fluid volume generation system can operate more quickly, generating 3D fluid volumes quicker than when using traditional physically based simulations.

The 3D fluid volume generation system leverages a machine learning system to generate the coarse 3D fluid volume, the machine learning system being trained based on a set of training data. The 3D fluid volume generation system uses a data-driven approach that need not make assumptions about the object being modeled (e.g., assumptions that the model is symmetric, is revolving, is a quadruped animal, is a tree, etc.).

Furthermore, the 3D fluid volume generation system uses the 2D sketch as a final desired state that the generated 3D fluid volume is to match. A full physically based simulation from a beginning state to a target state need not be run—the 3D fluid volume generation system can rely on simply the 2D sketch, having itself generated a starting state for the refinement stage from the input from the coarse volume generation stage.

Additionally, the 3D fluid volume generation system allows users with little to no 3D modeling experience to intuitively create a 3D fluid volume. The user need not have any knowledge of how 3D modeling works or how to set up a simulation system. Rather, the user need simply provide a 2D sketch of an outline of a fluid for which the 3D fluid volume is to be generated, and the 3D fluid volume generation system automatically generates a 3D fluid volume that is physically correct (realistic looking) for the 2D sketch.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
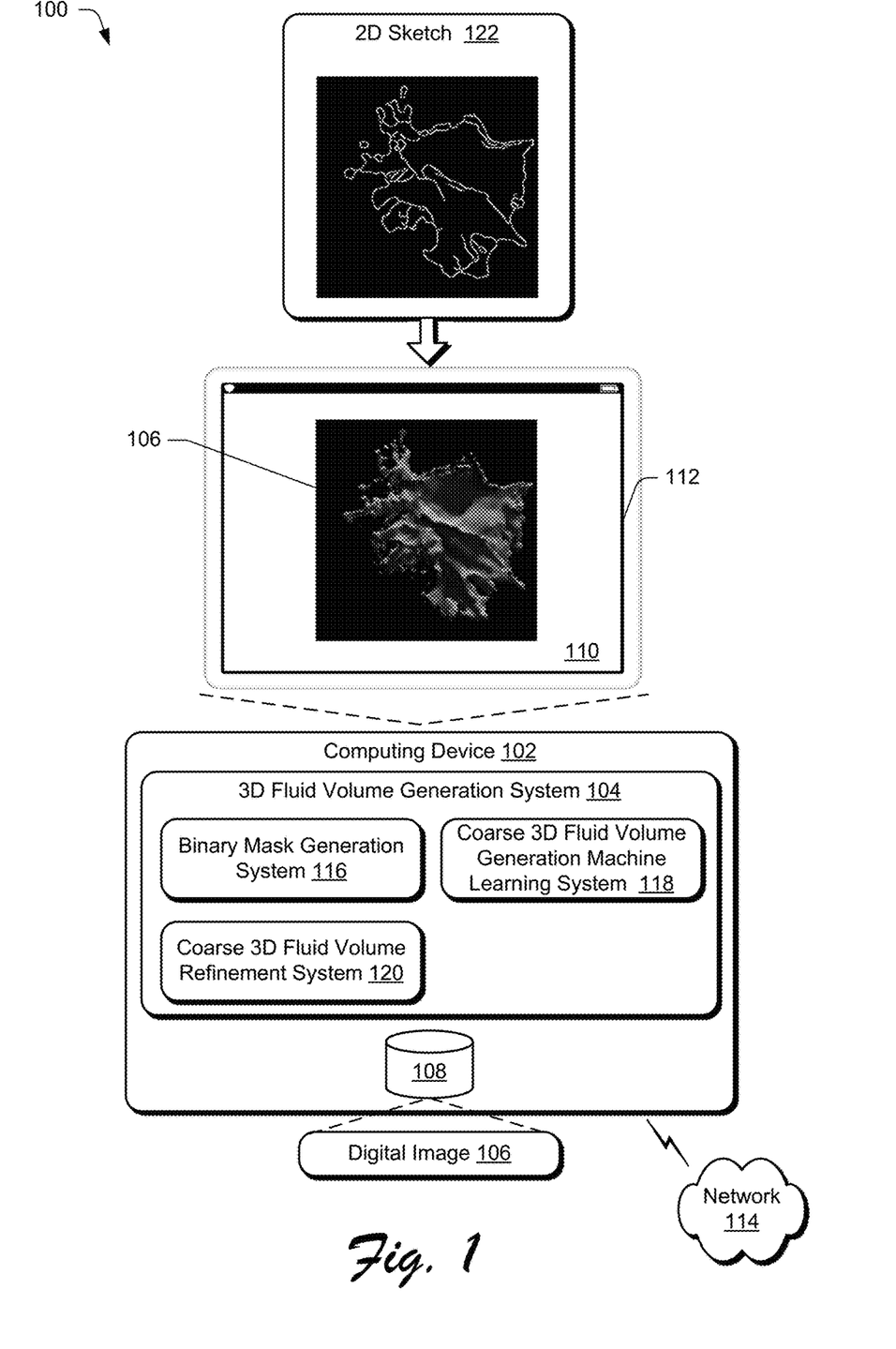
FIG. 1 is an illustration of a digital medium environment in an example implementation that is operable to employ the sketch-based 3D fluid volume generation using a machine learning system techniques described herein.

FIG. 1 is an illustration of a digital medium environment 100 in an example implementation that is operable to employ the sketch-based 3D fluid volume generation using a machine learning system techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

The computing device 102 is illustrated as including a 3D fluid volume generation system 104. The 3D fluid volume generation system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. The storage 108 can be any of a variety of different types of storage, such as random access memory (RAM), Flash memory, solid state drive, magnetic disk drive, and so forth. Although illustrated as implemented locally at the computing device 102, functionality of the 3D fluid volume generation system 104 may also be implemented in whole or part via functionality available via the network 114, such as part of a web service or "in the cloud."

An example of functionality incorporated by the 3D fluid volume generation system 104 to process the digital image 106 is illustrated as a binary mask generation system 116, a coarse 3D fluid volume generation machine learning system 118, and a coarse 3D fluid volume refinement system 120. The binary mask generation system 116 implements functionality to generate a binary mask from an input 2D sketch 122 of an outline of a fluid. The coarse 3D fluid volume generation machine learning system 118 implements functionality to generate a coarse 3D volume based on the input 2D sketch 122. The coarse 3D fluid volume refinement system 120 implements functionality to refine the coarse 3D volume generated by the coarse 3D fluid volume generation machine learning system 118 to better match the 2D sketch 122, and output the 3D fluid volume for the 2D sketch as the digital image 106.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

3D Fluid Volume Generation System Architecture

Figure 2:
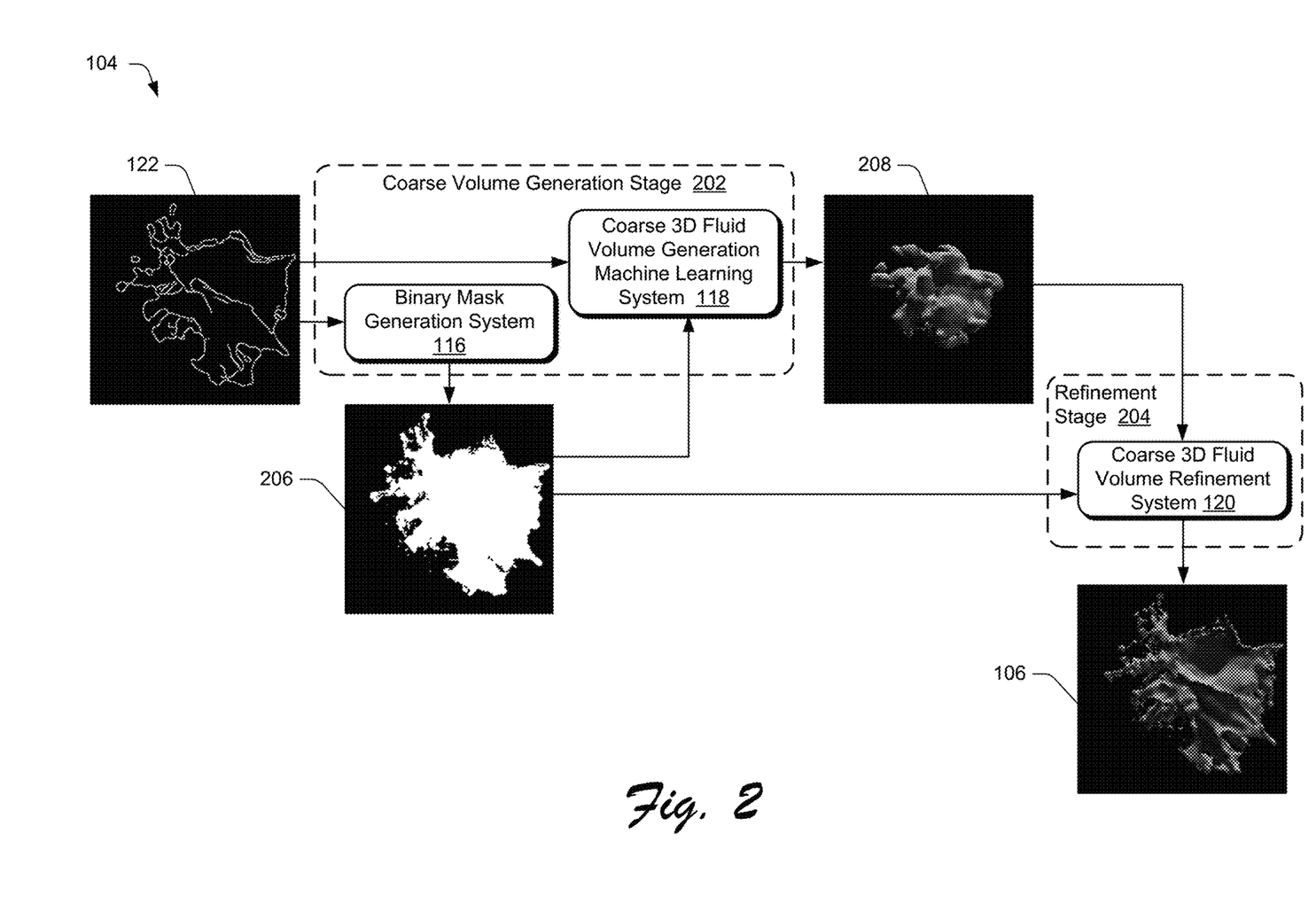
FIG. 2 is an illustration of an example architecture of a table 3D fluid volume generation system.

FIG. 2 is an illustration of an example architecture of a table 3D fluid volume generation system 104. The 3D fluid volume generation system 104 includes a coarse volume generation stage 202 that includes the binary mask generation system 116 and the coarse 3D fluid volume generation machine learning system 118, and a refinement stage 204 that includes the coarse 3D fluid volume refinement system 120. The 3D fluid volume generation system 104 receives a 2D sketch 122 and implements functionality to generate, from the 2D sketch 122, a 3D fluid volume illustrated as the digital image 106.

In the coarse volume generation stage 202, the binary mask generation system 116 obtains the 2D sketch 122 and generates a binary mask 206 from the 2D sketch 122. The binary mask 206 is a filled-in version of the 2D sketch 122, with the outline in the 2D sketch 122 and the area enclosed by the outline in the 2D sketch 122 having one value (e.g., 1), and other areas not part of the outline in the 2D sketch 122 or enclosed by the outline in the 2D sketch 122 having another value (e.g., 0).

In the illustrated example, the binary mask 206 is generated by the binary mask generation system 116 as part of the coarse volume generation stage 202. Additionally or alternatively, the binary mask 206 can be generated at other times or obtained from other sources. In such situations, the coarse volume generation stage 202 need not include the binary mask generation system 116.

The coarse 3D fluid volume generation machine learning system 118 receives the 2D sketch 122 of the outline of the fluid and the binary mask 206 generated from the 2D sketch, and based on these inputs generates a coarse 3D fluid volume 208 for the fluid. In one or more implementations, the coarse 3D fluid volume 208 is a density grid, with each cell in the grid having a value ranging from 0 to 1. A value of 1 indicates the entire cell is filled with fluid, a value of 0 indicates there's no fluid in the cell, and a value between 0 and 1 indicates that the cell is partially filled with fluid. This is illustrated with various levels of darkness in the coarse 3D fluid volume 208.

As illustrated, the coarse 3D fluid volume 208 describes the 3D volume represented by the 2D sketch 122 coarsely or roughly. The coarse 3D volume 208 is a close approximation of the 2D sketch 122 that roughly matches the 2D sketch 122 in each contour and that can be generated quickly in the coarse volume generation stage 202, but the coarse 3D fluid volume 208 typically does not exactly match the 2D sketch 122.

In the refinement stage 204, the coarse 3D fluid volume 208 is refined to better match the 2D sketch 122, and the 3D fluid volume 106 for the 2D sketch 122 is output. The refinement stage 204 is an iterative process, receiving a 3D fluid volume that, on the first iteration, is the coarse 3D fluid volume 208 generated in the coarse volume generation stage 208. The coarse 3D fluid volume refinement system 120 generates a binary mask from the received 3D fluid volume, such as by using an edge detector to identify a 2D outline of the 3D fluid volume, and generating a binary mask from the 2D outline (e.g., in the same manner as the binary mask generation system 116 generates the binary mask 206). The difference between the edge of the generated binary mask generated by the coarse 3D fluid volume refinement system 120 and the binary mask 206 generated from the original user input 2D sketch 122 is determined, and a 3D velocity field is generated from the difference between edges of the two binary masks. The 3D velocity field is input to a physically based fluid simulator, which generates a 3D fluid volume given the input 3D fluid volume. This generated 3D fluid volume is then the input to the next iteration of the refinement stage. This iterative process continues until the difference between the edge of the generated binary mask and the binary mask 206 is less than a threshold amount, at which point the iterative process stops and the most recently generated 3D fluid volume is output as the 3D fluid volume 106.

Figure 3:
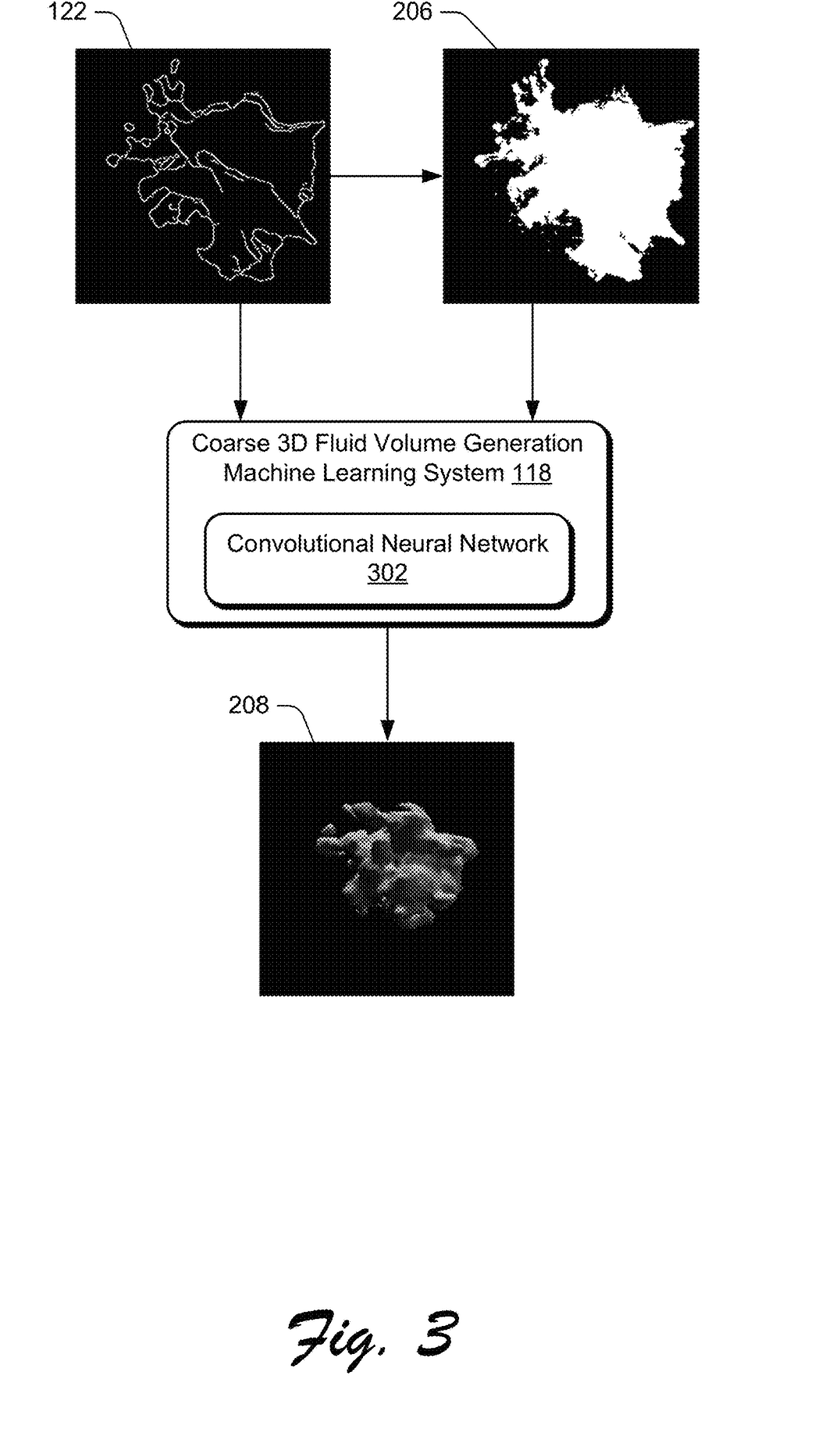
FIG. 3 illustrates an example implementation of the coarse 3D fluid volume generation machine learning system.

FIG. 3 illustrates an example implementation of the coarse 3D fluid volume generation machine learning system 118. The coarse 3D fluid volume generation machine learning system 118 receives the 2D sketch 122 of an outline of a fluid and the binary mask 206 generated from the 2D sketch 122. The binary mask 206 can be obtained from various different sources as discussed above.

The coarse 3D fluid volume generation machine learning system 118 can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In the illustrated example, the coarse 3D fluid volume generation machine learning system 118 employs a convolutional neural network, illustrated as convolutional neural network 302. A convolutional neural network is formed from layers of nodes (i.e., neurons) and can include various layers such as an input layer, an output layer, and one or more hidden layers such as convolutional layers, pooling layers, activation layers, fully connected layers, normalization layers, and so forth. Although the coarse 3D fluid volume generation machine learning system 118 is discussed herein as employing a convolutional neural network, it should be noted that the convolutional neural network 302 is an example, and that different types of machine learning systems can additionally or alternatively be employed by the coarse 3D fluid volume generation machine learning system 118.

The convolutional neural network 302 is trained to generate the coarse 3D fluid volume 208 from the 2D sketch 122 of an outline of the fluid and the binary mask 206 generated from the 2D sketch 122. In one or more implementations, the coarse 3D fluid volume 208 is a density grid, with each cell in the grid having a value ranging from 0 to 1. A value of 1 indicates the entire cell is filled with fluid, a value of 0 indicates there's no fluid in the cell, and a value between 0 and 1 indicates that the cell is partially filled with fluid.

Figure 4:
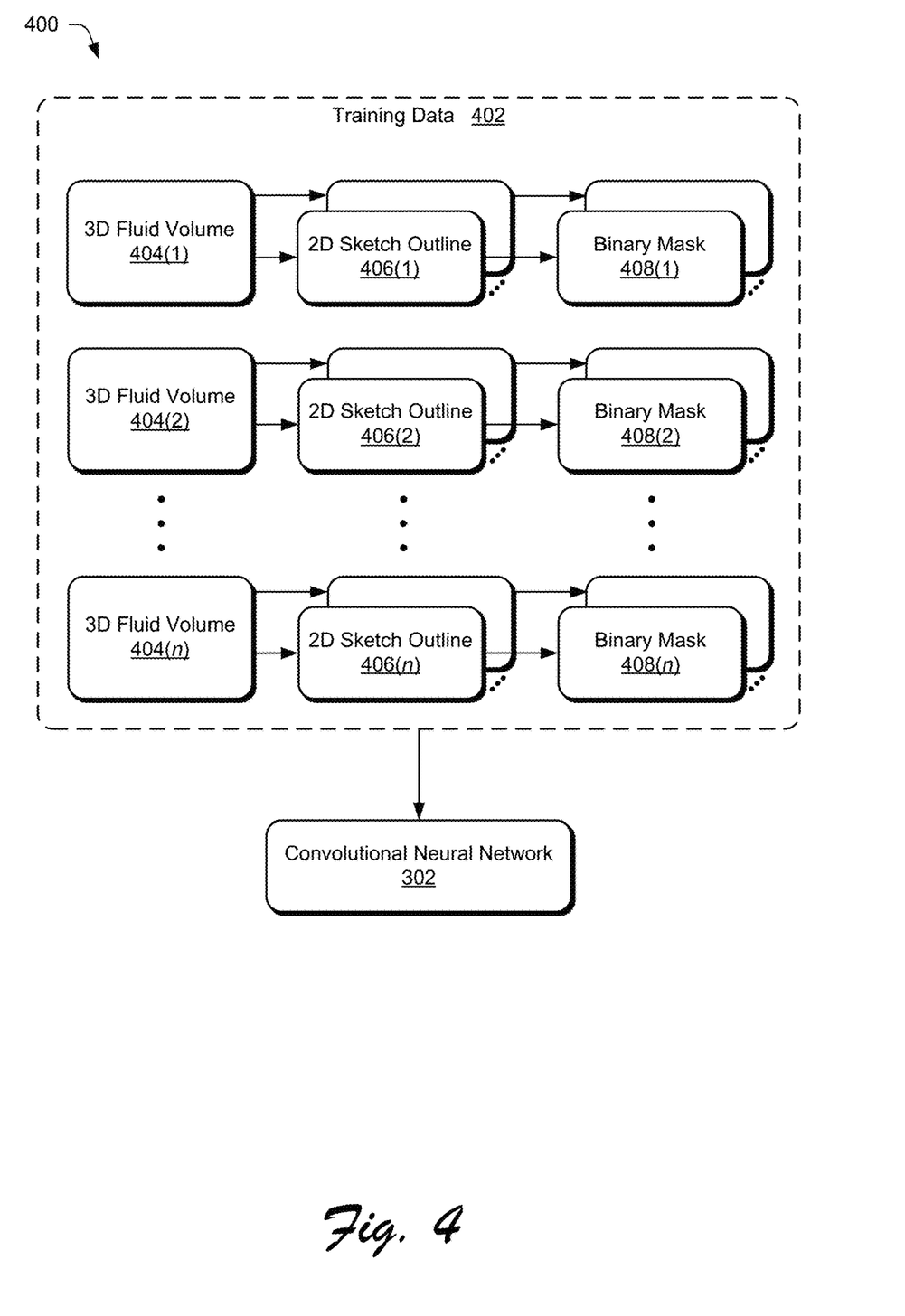
FIG. 4 illustrates an example of training a convolutional neural network of the coarse 3D fluid volume generation machine learning system.

FIG. 4 illustrates an example 400 of training the convolutional neural network 302. The convolutional neural network 302 is trained on a set of training data 402. The training data 402 includes multiple (n) 3D fluid volumes 404(1), . . . , 404(n), also referred to as training 3D fluid volumes. From each 3D fluid volume 404, the 3D fluid volume 404 is rendered from multiple different viewpoints and an edge detector is applied to the renderings to generate a set of 2D sketch outlines 406, also referred to as training 2D sketch outlines. The edge detector can be implemented using any of a variety of different public and/or proprietary edge detection techniques. Each 2D sketch outline 406 is used to generate a corresponding binary mask 408, also referred to as training binary masks. Thus, each 3D fluid volume 404 in the training data 402 has multiple corresponding 2D sketch outlines 406 and binary masks 408. The training data 402 can have any number of different 3D fluid volumes 404, such as thousands or tens of thousands.

The convolutional neural network 302 includes various filters with weights that are tuned (e.g., trained) to minimize the loss between the known 3D fluid volumes 404 from the training data 402 and the 3D fluid volumes generated by the convolutional neural network 302. The known 3D fluid volumes 404 are density grids, as are the 3D fluid volumes generated by the convolutional neural network 302. The loss between the known 3D fluid volumes 404 from the training data 402 and the 3D fluid volumes generated by the convolutional neural network 302 can be determined based on, for example, the differences between the values of the cells in the known 3D fluid volumes 404 and the values of the corresponding cells (e.g., cells in the same location, if any, relative to a point in a coordinate system) in the 3D fluid volumes generated by the convolutional neural network 302. Any of a variety of loss functions or algorithms can be used to train the convolutional neural network, such as a cross entropy loss function, a mean squared error, and so forth.

Figure 5:
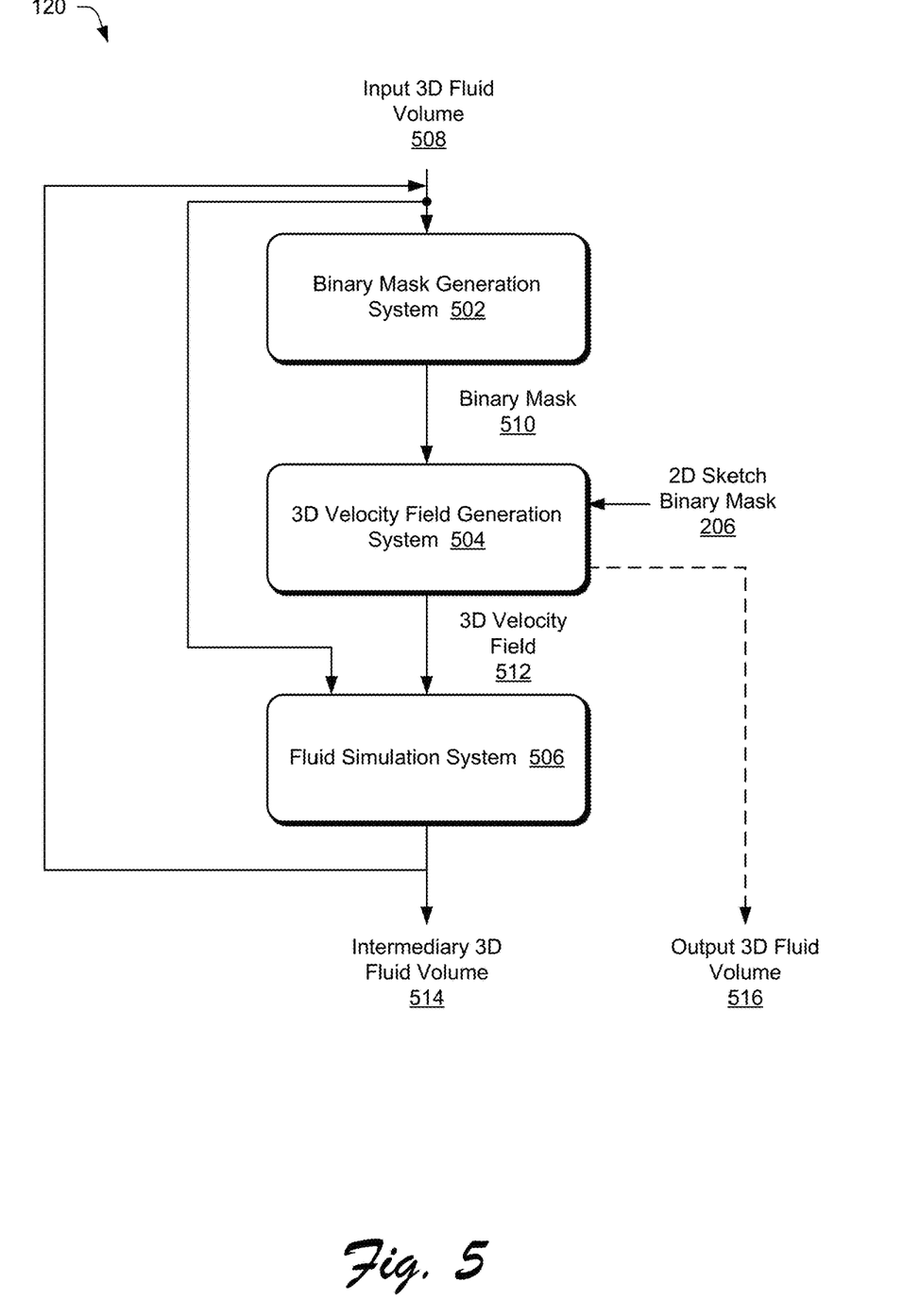
FIG. 5 illustrates an example implementation of the coarse fluid volume refinement system.

FIG. 5 illustrates an example implementation of the coarse 3D fluid volume refinement system 120. The coarse 3D fluid volume refinement system 120 receives the coarse 3D fluid volume 208 and the binary mask 206 generated from the 2D sketch 122, and generates the 3D fluid volume 106 corresponding to the 2D sketch 122.

The coarse 3D fluid volume refinement system 120 includes a binary mask generation system 502, a 3D velocity field generation system 504, and a fluid simulation system 506. The coarse 3D fluid volume refinement system 120 implements an iterative process, generating 3D fluid volumes until a set of conditions are satisfied.

The binary mask generation system 502 receives as an input on the first iteration a 3D fluid volume 508. On the first iteration, the 3D fluid volume is the coarse 3D fluid volume 208 generated in the coarse volume generation stage 202. The binary mask generation system 502 generates a binary mask 510 for the input 3D fluid volume 508, such as by using an edge detector to identify a 2D outline of the 3D fluid volume, and generating a binary mask from the 2D outline (e.g., in the same manner as the binary mask generation system 116 generates a binary mask from the 2D sketch discussed above).

The binary mask 510 is input to the 3D velocity field generation system 504. The 3D velocity field generation system 504 determines the difference between the edge (contour) of the generated binary mask 510 and the binary mask 206 from the original user input 2D sketch, and a 3D velocity field is generated from the difference between the binary masks. The 3D velocity field describes the movement of the input 3D fluid volume 508 in order for the binary mask 510 to better match the binary mask 206.

Figure 6:
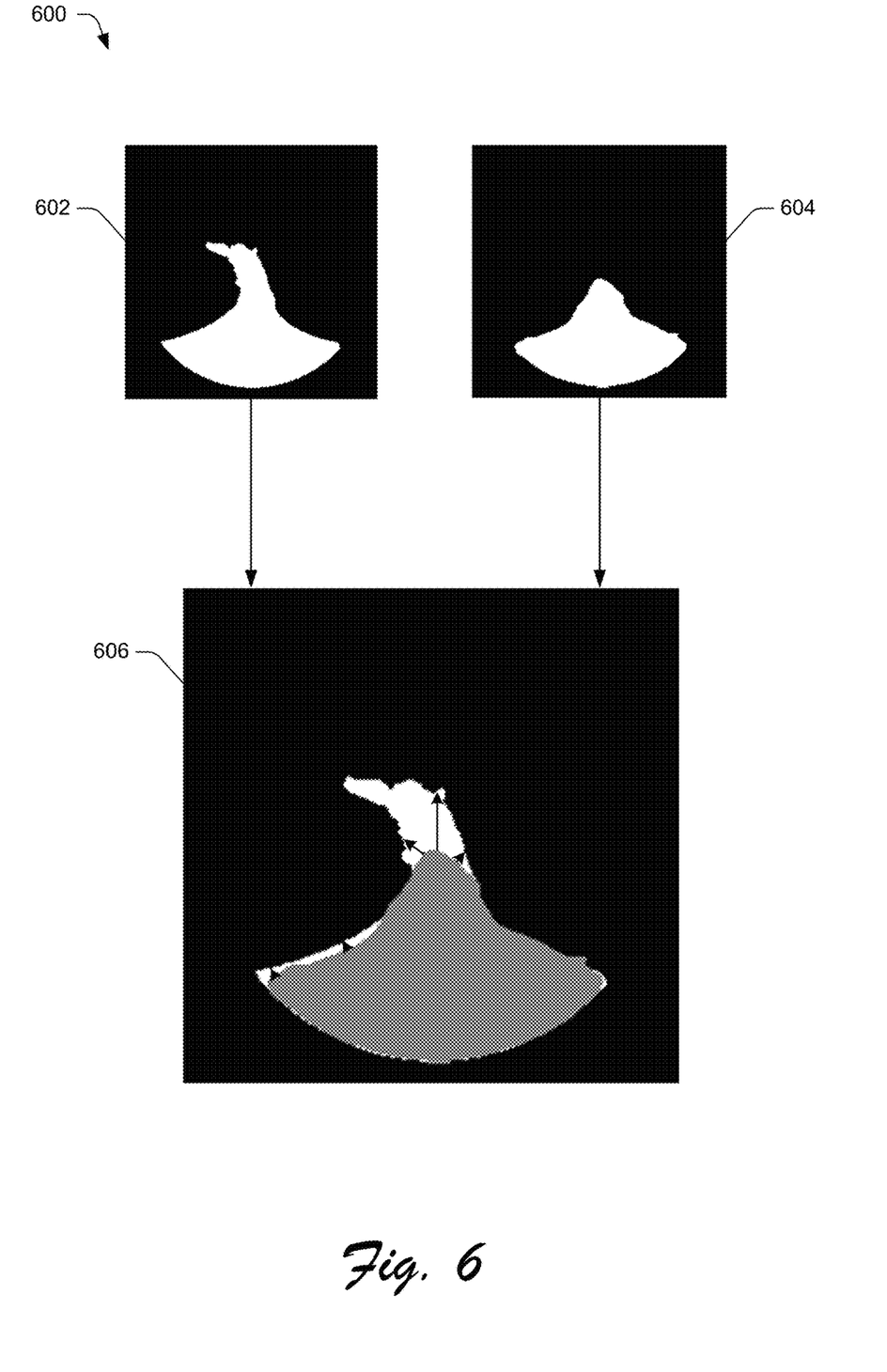
FIG. 6 illustrates an example at of generating the 3D velocity field.

FIG. 6 illustrates an example at 600 of generating the 3D velocity field. Illustrated in the example 600 is a binary mask 602 from the original user input 2D sketch and a binary mask 604 generated by the binary mask generation system 502. One of the binary masks 602, 604 is overlaid on top of the other, illustrated at 606 as the binary mask 604 (illustrated as grayed out) overlaying the binary mask 602. For each point (e.g., each pixel) on the binary mask 604, the direction and distance to a matching point on the binary mask 602 is identified. For a given point on the binary mask 604, the matching point on the binary mask 602 is determined by computing the gradient on the edge of the binary mask 604 (computing the direction that is perpendicular to the slope at that point on the edge of the binary mask 604). Following that computed direction, the first intersection point on the binary mask 602 is the matching point on the binary mask 602. These directions are illustrated in the example 600 at 606 as arrows from the binary mask 604 towards the binary mask 602. It should be noted that different points on the binary mask 604 typically have different matching points on the binary mask 602, although in some situations multiple points on the binary mask 604 can have the same matching point on the binary mask 602.

The 3D velocity field generation system 604 computes a 2D velocity field based on the directions and the lengths from each point on the binary mask 604 to a matching point on the binary mask 602 (e.g., the directions and lengths of the arrows from the binary mask 604 towards the binary mask 602). Longer distances (e.g., longer arrows) indicate there is a longer distance to travel before reaching the goal, so larger velocity values are used for those distances. The direction of the speed is the direction from the point on the binary mask 604 to the matching point on the binary mask 602.

Returning to FIG. 5, the 3D velocity field generation system 504 converts the 2D velocity field to a 3D velocity field by copying the 2D velocity field to every layer in a 3D grid corresponding to the input 3D fluid volume 508. The 3D velocity field generation system 504 outputs this 3D velocity field 512 to the fluid simulation system 506.

The fluid simulation system 506 is a physically based fluid simulator, and can be any of a variety of different public and/or proprietary physically based fluid simulators. In one or more implementations, the fluid simulation system 506 is a set of fluid mechanics equations that describes how the fluid moves or flows, and is intended to represent or model the physical movement or flow of the fluid (e.g., the real-world movement or flow of the fluid). The input 3D fluid volume 508 and the 3D velocity field 512 are input to the fluid simulation system 506. The fluid simulation system 506 uses the 3D velocity field 512 to deform the input 3D fluid volume 508 in accordance with the 3D velocity field 512 to generate a new 3D fluid volume that has a binary mask that better matches (has fewer differences from) the 2D sketch binary mask 206.

The new 3D fluid volume generated by the fluid simulation system 506 is illustrated as intermediary 3D fluid volume 514. The intermediary 3D fluid volume 514 is input to the binary mask generation system 502 as the input 3D fluid volume 508 for the next iteration. This iterative process allows new 3D feature vectors to be generated that, iteration by iteration, have binary masks that get closer and closer to the 2D sketch binary mask 206.

The coarse 3D fluid volume refinement system 120 continues with this iterative process, generating new 3D fluid volumes to use as the input 3D fluid volume 308 until a set of conditions are satisfied. In one or more implementations, this set of conditions is that the 3D velocity field generation system 504 determines that the binary mask 510 is close enough to the 2D sketch binary mask. Whether the binary mask 510 is close enough to the 2D sketch binary mask 206 can be determined in various different manners. For example, the average of the distances between the points on the edge of the binary mask 510 and the edge of the 2D sketch binary mask 206 can be calculated, and if the calculated average is less than a threshold amount (e.g., 2 pixels), then the binary mask 510 is determined to be close enough to the 2D binary mask 206. Whether the binary mask 510 is close enough to the 2D sketch binary mask 206 can additionally or alternatively be determined in other manners, such as when no more than a threshold number (e.g., 10) of the distances between the points on the edge of the binary mask 510 and the points on the edge of the 2D sketch binary mask 206 are greater than a threshold amount (e.g., 2 pixels).

Additionally or alternatively, this set of conditions can be implemented in different manners. For example, this set of conditions can be that a threshold number (e.g., 10) iterations have been performed as part of this iterative process. By way of another example, this set of conditions can be that the iterative process has been performed for a threshold amount of time (e.g., 2 seconds).

In response to determining that the set of conditions are satisfied (e.g., the binary mask 510 is close enough to the 2D sketch binary mask 206), the 3D velocity field generation system 504 outputs the most recent input 3D fluid volume 508 as the 3D fluid volume generated by the coarse 3D fluid volume refinement system 120, illustrated as the output 3D fluid volume 516. Typically the output 3D fluid volume 516 is the intermediary 3D fluid volume 514 generated on the previous iteration. Additionally or alternatively, in some situations the output 3D fluid volume 516 is the initial input 3D fluid volume 508 (the coarse 3D fluid volume 208) if the coarse 3D fluid volume 208 has a binary mask that is close enough to the 2D sketch binary mask 206.

In the first iteration, the input 3D fluid volume 508 is an input to the fluid simulation system 506. However, it should be noted that in subsequent iterations the input 3D fluid volume 508 was generated by the fluid simulation system 506 in a previous iteration, so the fluid simulation system 506 can simply maintain a copy of that input 3D fluid volume 508 rather than having it be a separate input to the 506.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-6.

Figure 7:
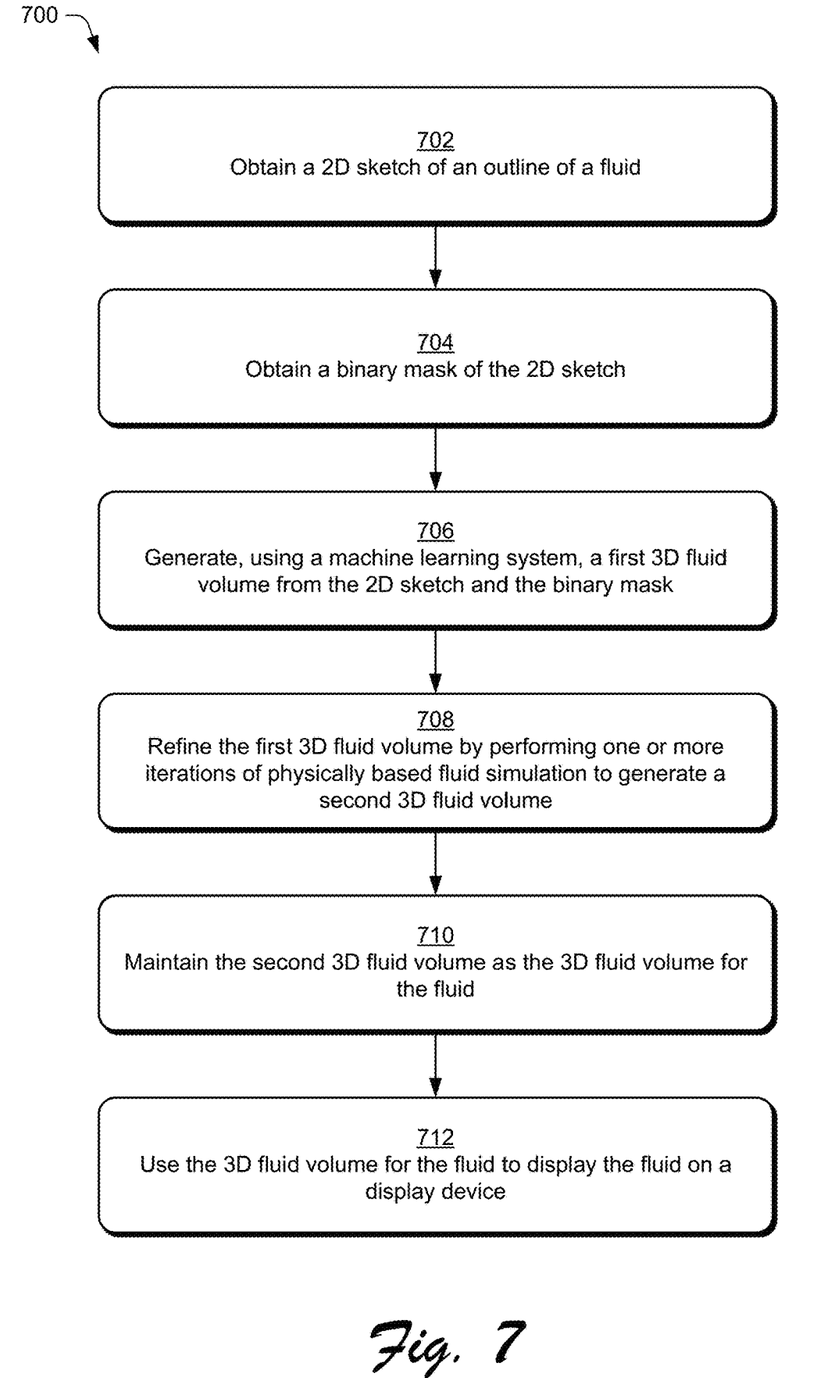
FIG. 7 is a flow diagram depicting a procedure in an example implementation of sketch-based 3D fluid volume generation using a machine learning system.

FIG. 7 is a flow diagram depicting a procedure in an example implementation of sketch-based 3D fluid volume generation using a machine learning system. In this example, a 2D sketch of an outline of a fluid is obtained (block 702). The 2D sketch can be obtained, for example, from a user drawing the shape or contour of the fluid he or she desires on a touchscreen device, a scanned or otherwise digitally captured image, and so forth.

A binary mask of the 2D sketch is obtained (block 704). The binary mask of the 2D sketch can be generated by the 3D fluid volume generation system 104, or alternatively generated by another device or system and provided to the 3D fluid volume generation system 104 as discussed above.

A first 3D fluid volume is generated from the 2D sketch and the binary mask using a machine learning system (block 706). The 2D sketch is the 2D sketch obtained in block 702, and the binary mask is the binary mask obtained in block 704. The machine learning system is, for example, a convolutional neural network trained to generate a coarse 3D fluid volume from a 2D sketch of an outline of the fluid and a binary mask generated from the 2D sketch, as discussed above.

The first 3D fluid volume is refined by performing one or more iterations of physically based fluid simulation to generate a second 3D fluid volume (block 708). This refinement is performed in part by a fluid simulation system using a 3D velocity field generated based on the difference between the obtained binary mask of the 2D sketch and a binary mask of the first 3D fluid volume, as discussed above.

The second 3D fluid volume is maintained as the 3D fluid volume for the fluid (block 710). This 3D fluid volume can be can be stored in a local or remote storage device, communicated to another device or system, and so forth. This 3D fluid volume is roughly aligned with the 2D sketch (e.g., a binary mask generated from this 3D fluid volume is close enough to the obtained binary mask of the 2D sketch).

The 3D fluid volume for the fluid is also used to display the fluid on a display device (block 712). The 3D fluid volume can be displayed alone, with other 3D fluid volumes, with other 2D images, combinations thereof, and so forth. For example, the 3D fluid volume can be displayed as part of a digital content composition tool that allows 2D and 3D content to be displayed concurrently in a static scene.

Example System and Device

Figure 8:
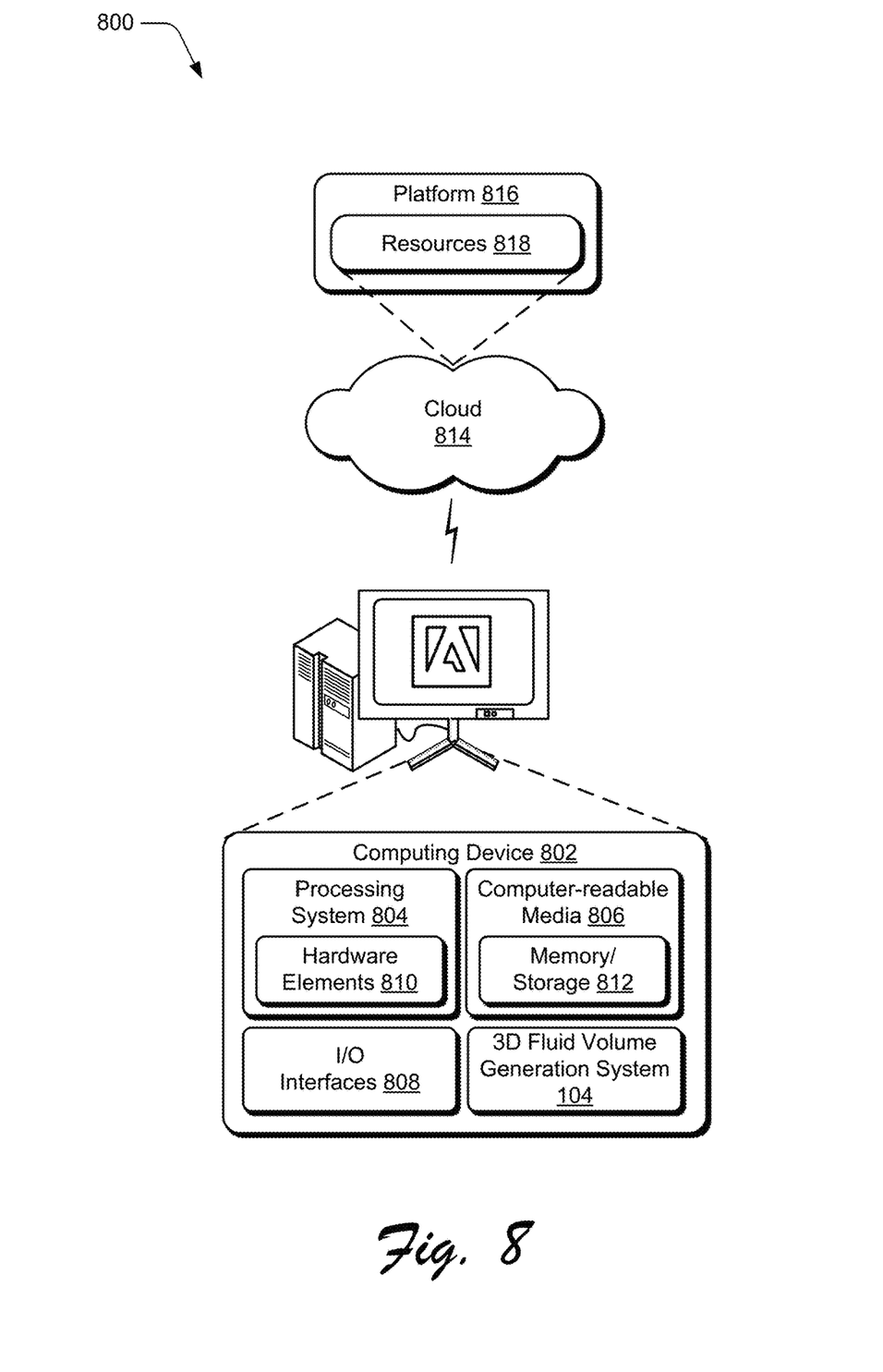
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the 3D fluid volume generation system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a 3D fluid volume for a fluid, a method implemented by a computing device, the method comprising:
   obtaining a 2D sketch of an outline of the fluid;
   obtaining a first binary mask of the 2D sketch;
   generating, using a machine learning system, a first 3D fluid volume from the 2D sketch and the first binary mask;
   refining the first 3D fluid volume by performing one or more iterations of physically based fluid simulation based on the first 3D fluid volume to generate a second 3D fluid volume; and
   maintaining the second 3D fluid volume as the 3D fluid volume for the fluid.

2. The method as described in claim 1, the obtaining 2D sketch comprising receiving a user input sketch that is the 2D sketch.

3. The method as described in claim 1, the machine learning system comprising a convolutional neural network trained to generate a coarse 3D fluid volume from the 2D sketch and the first binary mask, the first 3D fluid volume comprising the coarse 3D fluid volume.

4. The method as described in claim 3, the convolutional neural network having been trained on a set of training data including multiple training 3D fluid volumes, for each training 3D fluid volume at least one corresponding training 2D sketch outline of a viewpoint of the training 3D fluid volume, and for each training 2D sketch outline of a viewpoint of the training 3D fluid volume a corresponding training binary mask.

5. The method as described in claim 1, the obtaining the first binary mask comprising generating the first binary mask by assigning all areas enclosed by the 2D sketch one value and the other areas not enclosed by the 2D sketch another value.

6. The method as described in claim 1, the refining comprising:
   receiving an input 3D fluid volume, the input 3D fluid volume comprising the first 3D fluid volume on a first iteration of the one or more iterations;
   generating a second binary mask from the input 3D fluid volume;
   determining a velocity field based on a difference between the contour of the first binary mask and the contour of the second binary mask; and
   generating an intermediary 3D fluid volume using the physically based fluid simulation to deform the input 3D fluid volume in accordance with the velocity field.

7. The method as described in claim 6, further comprising repeating, for each of one or more additional iterations, the receiving the input 3D fluid volume, the generating the second binary mask, the determining the velocity field, and the generating the intermediary 3D fluid volume, the input 3D fluid volume for each of the one or more additional iterations comprising the intermediary 3D fluid volume generated by the previous iteration.

8. The method as described in claim 6, further comprising performing the one or more additional iterations until the second binary mask is close enough to the first binary mask.

9. The method as described in claim 8, further comprising determining that the secondary binary mask is close enough to the first binary mask in response to an average of distances between points on the edge of the secondary binary mask and points on the edge of the first binary mask being less than a threshold amount.

10. A system comprising:
    means for obtaining a 2D sketch of an outline of a fluid;
    means for obtaining a first binary mask of the 2D sketch;
    means for generating, using a machine learning system, a first 3D fluid volume from the 2D sketch and the first binary mask;
    means for refining the first 3D fluid volume by performing one or more iterations of physically based fluid simulation based on the first 3D fluid volume to generate a second 3D fluid volume; and
    means for maintaining the second 3D fluid volume as a 3D fluid volume for the fluid.

11. The system as described in claim 10, the means for obtaining the 2D sketch comprising means for receiving a user input sketch that is the 2D sketch.

12. The system as described in claim 10, the machine learning system comprising a convolutional neural network trained to generate a coarse 3D fluid volume from the 2D sketch and the first binary mask, the first 3D fluid volume comprising the coarse 3D fluid volume.

13. The system as described in claim 12, the convolutional neural network having been trained on a set of training data including multiple training 3D fluid volumes, for each training 3D fluid volume at least one corresponding training 2D sketch outline of a viewpoint of the training 3D fluid volume, and for each training 2D sketch outline of a viewpoint of the training 3D fluid volume a corresponding training binary mask.

14. The system as described in claim 10, the means for refining comprising:
   means for receiving an input 3D fluid volume, the input 3D fluid volume comprising the first 3D fluid volume on a first iteration of the one or more iterations;
   means for generating a second binary mask from the input 3D fluid volume;
   means for determining a velocity field based on a difference between the contour of the first binary mask and the contour of the second binary mask; and
   means for generating an intermediary 3D fluid volume using the physically based fluid simulation to deform the input 3D fluid volume in accordance with the velocity field.

15. In a digital medium environment to generate a 3D fluid volume for a fluid, a computing device comprising:
   a processor; and
   non-transitory computer-readable storage media having stored thereon multiple instructions that, responsive to execution by the processor, cause the processor to perform operations comprising:
      obtaining a 2D sketch of an outline of the fluid;
      obtaining a first binary mask of the 2D sketch;
      generating, using a machine learning system, a first 3D fluid volume from the 2D sketch and the first binary mask;
      refining the first 3D fluid volume by performing one or more iterations of physically based fluid simulation based on the first 3D fluid volume to generate a second 3D fluid volume; and
      maintaining the second 3D fluid volume as the 3D fluid volume for the fluid.

16. The computing device as described in claim 15, the obtaining the 2D sketch comprising receiving a user input sketch that is the 2D sketch.

17. The computing device as described in claim 15, the machine learning system comprising a convolutional neural network trained to generate a coarse 3D fluid volume from the 2D sketch and the first binary mask, the first 3D fluid volume comprising the coarse 3D fluid volume.

18. The computing device as described in claim 17, the convolutional neural network having been trained on a set of training data including multiple training 3D fluid volumes, for each training 3D fluid volume at least one corresponding training 2D sketch outline of a viewpoint of the training 3D fluid volume, and for each training 2D sketch outline of a viewpoint of the training 3D fluid volume a corresponding training binary mask.

19. The computing device as described in claim 15, the refining comprising:
   receiving an input 3D fluid volume, the input 3D fluid volume comprising the first 3D fluid volume on a first iteration of the one or more iterations;
   generating a second binary mask from the first 3D fluid volume;
   determining a velocity field based on a difference between the contour of the first binary mask and the contour of the second binary mask; and
   generating an intermediary 3D fluid volume using the physically based fluid simulation to deform the input 3D fluid volume in accordance with the velocity field.

20. The computing device as described in claim 19, the operations further comprising:
   repeating, for each of one or more additional iterations, the receiving the input 3D fluid volume, the generating the second binary mask, the determining the velocity field, and the generating the intermediary 3D fluid volume, the input 3D fluid volume for each of the one or more additional iterations comprising the intermediary 3D fluid volume generated by the previous iteration; and
   performing the one or more additional iterations until an average of distances between points on the edge of the secondary binary mask and points on the edge of the first binary mask is less than a threshold amount.

* * * * *